(12) United States Patent
Czaplicki

(10) Patent No.: US 6,358,584 B1
(45) Date of Patent: Mar. 19, 2002

(54) TUBE REINFORCEMENT WITH DEFLECTING WINGS AND STRUCTURAL FOAM

(75) Inventor: Michael J. Czaplicki, Rochester, MI (US)

(73) Assignee: L&L Products, Romeo, MI (US)

( * ) Notice: Subject to any disclaimer, the term of this patent is extended or adjusted under 35 U.S.C. 154(b) by 0 days.

(21) Appl. No.: 09/428,243

(22) Filed: Oct. 27, 1999

(51) Int. Cl.[7] ............... B29D 22/00; B29D 23/00
(52) U.S. Cl. ............ 428/36.5; 428/319.1; 428/319.3; 428/316.6; 138/98; 138/106; 138/115; 138/172
(58) Field of Search ............ 428/319.1, 319.3, 428/316.6, 36.5; 138/98, 106, 115, 172

(56) References Cited

U.S. PATENT DOCUMENTS

| | | | |
|---|---|---|---|
| 3,054,636 A | 9/1962 | Wessels, III | 296/28 |
| 3,123,170 A | 3/1964 | Bryant | 180/68 |
| 3,493,257 A | 2/1970 | Fitzgerald et al. | 293/71 |
| 3,665,968 A | 5/1972 | DePutter | 138/141 |
| 3,746,387 A | 7/1973 | Schwenk | 296/28 F |
| 3,757,559 A | 9/1973 | Welsh | 72/379 |
| 3,890,108 A | 6/1975 | Welsh | 29/191.4 |
| 4,019,301 A | 4/1977 | Fox | 52/725 |
| 4,082,825 A | 4/1978 | Puterbaugh | 264/46.5 |
| 4,090,734 A | 5/1978 | Inami et al. | 296/146 |

(List continued on next page.)

FOREIGN PATENT DOCUMENTS

| | | |
|---|---|---|
| DE | 2919046 | 5/1979 |
| DE | 9011147.8 | 9/1990 |
| DE | 4028895 C1 | 2/1992 |
| DE | 9320333.0 | 6/1994 |
| DE | 19812288 C1 | 9/1999 |
| DE | 19856255 C1 | 1/2000 |
| DE | 19858903 A1 | 6/2000 |
| EP | 82102135.9 | 3/1982 |
| EP | 90202150.0 | 8/1990 |
| EP | 91104546.6 | 3/1991 |

(List continued on next page.)

OTHER PUBLICATIONS

Co–pending Application Serial No. 09/524,960, filed Mar. 14, 2000.
Co–pending Application Serial No. 09/524,961; filed Mar. 14, 2000.
Co–pending Application Serial No. 09/460,322; filed Dec. 10, 1999.
Co–pending Application Serial No. 09/459,756; filed Dec. 10, 1999.
Co–pending Application Serial No. 09/524,298; filed Mar. 14, 2000.
Co–pending Application Serial No. 09/502,686; filed Feb. 11, 2000.
Co–pending Application Serial No. 09/591,877; filed Jun. 12, 2000.
Co–pending Application Serial No. 09/631,211; filed Aug. 3, 2000.

(List continued on next page.)

Primary Examiner—Blaine Copenheaver
Assistant Examiner—Leanna Roché
(74) Attorney, Agent, or Firm—Dobrusin & Thennisch PC

(57) ABSTRACT

A tube reinforcement assembly is designed to reinforce complex tube structures, such as those having bends or varying inner diameters. The assembly includes a carrier and a plurality of spring-biased, deflecting wings around the carrier. The wings have structural foam layers on both surfaces that expand when heated. In one application, the wings of the assembly are compressed so that the assembly can fit around bends and narrow areas within the tube. Once the assembly is in its desired position, the structural foam is expanded and cured so that one expanded foam layer presses against the inner wall of the tube structure and the other expanded foam layer presses against the carrier of the reinforcement assembly.

20 Claims, 2 Drawing Sheets

U.S. PATENT DOCUMENTS

| | | | |
|---|---|---|---|
| 4,238,540 A | 12/1980 | Yates et al. ................... 428/36 |
| 4,378,395 A | 3/1983 | Asoshina et al. ........... 428/158 |
| 4,397,490 A | 8/1983 | Evans et al. ................ 293/120 |
| 4,440,434 A | 4/1984 | Celli .......................... 296/185 |
| 4,457,555 A | 7/1984 | Draper ....................... 296/186 |
| 4,559,274 A | 12/1985 | Kloppe et al. .............. 428/594 |
| 4,610,836 A | 9/1986 | Wycech ....................... 264/313 |
| 4,613,177 A | 9/1986 | Loren et al. ................ 293/120 |
| 4,705,716 A | 11/1987 | Tang ........................... 428/251 |
| 4,732,806 A | 3/1988 | Wycech ....................... 428/241 |
| 4,751,249 A | 6/1988 | Wycech ......................... 521/54 |
| 4,762,352 A | 8/1988 | Enomoto .................... 293/120 |
| 4,803,108 A | 2/1989 | Leuchten et al. ........... 428/118 |
| 4,836,516 A | 6/1989 | Wycech ....................... 267/279 |
| 4,853,270 A | 8/1989 | Wycech .......................... 428/68 |
| 4,861,097 A | 8/1989 | Wycech ....................... 296/188 |
| 4,898,630 A | 2/1990 | Kitoh et al. .................. 156/79 |
| 4,901,500 A | 2/1990 | Wycech ......................... 52/793 |
| 4,908,930 A | 3/1990 | Wycech ..................... 29/527.2 |
| 4,917,435 A | 4/1990 | Bonnett et al. ............. 296/190 |
| 4,922,596 A | 5/1990 | Wycech ..................... 29/897.2 |
| 4,923,902 A | 5/1990 | Wycech ......................... 521/54 |
| 4,978,562 A | 12/1990 | Wycech ..................... 428/35.8 |
| 4,989,913 A | 2/1991 | Moore, III .................. 296/205 |
| 4,995,545 A | 2/1991 | Wycech ....................... 228/119 |
| 5,102,188 A | 4/1992 | Yamane ...................... 296/205 |
| 5,122,398 A | 6/1992 | Seiler et al. .................. 428/31 |
| 5,124,186 A | 6/1992 | Wycech ..................... 428/35.8 |
| 5,213,391 A | 5/1993 | Takagi ........................ 296/205 |
| 5,255,487 A | 10/1993 | Wieting et al. ............... 52/728 |
| 5,266,133 A | 11/1993 | Hanley et al. ................ 156/71 |
| 5,344,208 A | 9/1994 | Bien et al. ................... 296/187 |
| 5,373,027 A | 12/1994 | Hanley et al. ............. 521/84.1 |
| 5,395,135 A | 3/1995 | Lim et al. ................... 280/751 |
| 5,506,025 A | 4/1996 | Otto et al. .................... 428/98 |
| 5,560,672 A | 10/1996 | Lim et al. ................... 296/189 |
| 5,575,526 A | 11/1996 | Wycech ....................... 296/205 |
| 5,580,120 A | 12/1996 | Nees et al. .............. 296/146.6 |
| 5,642,914 A | 7/1997 | Takabatake ................. 296/187 |
| 5,648,401 A | 7/1997 | Czaplicki et al. ............. 521/85 |
| 5,649,400 A | 7/1997 | Miwa ....................... 52/406.1 |
| 5,652,039 A | 7/1997 | Tremain et al. ............. 428/121 |
| 5,707,098 A | 1/1998 | Uchida et al. ........... 296/196.6 |
| 5,725,272 A | 3/1998 | Jones ......................... 296/208 |
| 5,731,069 A | 3/1998 | Delle Donne et al. ...... 428/215 |
| 5,755,486 A | 5/1998 | Wycech ....................... 296/188 |
| 5,766,719 A | 6/1998 | Rimkus ........................ 428/71 |
| 5,785,376 A | 7/1998 | Nees et al. .............. 296/146.6 |
| 5,786,394 A | 7/1998 | Slaven ......................... 521/51 |
| 5,803,533 A | 9/1998 | Schulz et al. ............... 296/204 |
| 5,804,608 A | 9/1998 | Nakazato et al. ........... 521/135 |
| 5,806,915 A | 9/1998 | Takabatake ................. 296/187 |
| 5,806,919 A | 9/1998 | Davies ....................... 296/205 |
| 5,819,408 A | 10/1998 | Catlin |
| 5,855,094 A | 1/1999 | Baudisch et al. ............. 49/502 |
| 5,866,052 A | 2/1999 | Muramatsu ................ 264/46.6 |
| 5,884,960 A | 3/1999 | Wycech .................. 296/146.6 |
| 5,885,688 A | 3/1999 | McLauglin ................. 428/131 |
| 5,888,600 A | 3/1999 | Wycech ..................... 428/35.9 |
| 5,888,642 A | 3/1999 | Meteer et al. ............ 428/313.5 |
| 5,901,528 A | 5/1999 | Richardson ................ 52/783.1 |
| 5,904,024 A | 5/1999 | Miwa ....................... 52/732.1 |
| 5,932,680 A | 8/1999 | Heider ......................... 528/59 |
| 5,934,737 A | 8/1999 | Abouzahr ................ 296/146.6 |
| 5,941,597 A | 8/1999 | Horiuchi et al. ........ 296/203.01 |
| 5,984,389 A | 11/1999 | Nuber ........................ 293/109 |
| 5,985,435 A | 11/1999 | Czaplicki et al. ........... 428/323 |
| 5,988,734 A | 11/1999 | Longo et al. .......... 296/203.01 |
| 5,992,923 A | 11/1999 | Wycech ..................... 296/188 |
| 5,994,422 A | 11/1999 | Born et al. .................. 521/139 |
| 6,003,274 A | 12/1999 | Wycech ....................... 52/232 |
| 6,004,425 A | 12/1999 | Born et al. .................. 156/335 |
| 6,022,066 A | 2/2000 | Tremblay et al. ........ 296/146.5 |
| 6,033,300 A | 3/2000 | Schneider ................... 454/147 |
| 6,050,630 A | 4/2000 | Hochet ....................... 296/187 |
| 6,058,673 A | 5/2000 | Wycech ..................... 52/721.4 |
| 6,059,342 A | 5/2000 | Kawai et al. .............. 296/39.1 |
| 6,068,424 A | 5/2000 | Wycech ....................... 403/269 |
| 6,077,884 A | 6/2000 | Hess et al. .................. 523/417 |
| 6,079,180 A | 6/2000 | Wycech ..................... 52/731.6 |
| 6,082,811 A | 7/2000 | Yoshida ..................... 296/188 |
| 6,090,232 A | 7/2000 | Seeliger et al. ............... 156/79 |
| 6,092,864 A | 7/2000 | Wycech et al. ............. 296/204 |
| 6,094,798 A | 8/2000 | Seeliger et al. ............... 29/469 |
| 6,096,403 A | 8/2000 | Wycech et al. ............. 428/122 |
| 6,096,791 A | 8/2000 | Born et al. .................... 521/54 |
| 6,099,948 A | 8/2000 | Paver, Jr. ................. 428/304.4 |
| 6,102,379 A | 8/2000 | Ponslet et al. .............. 267/136 |
| 6,102,473 A | 8/2000 | Steininger et al. .......... 296/209 |
| 6,103,341 A | 8/2000 | Barz et al. .................. 428/147 |
| 6,103,784 A | 8/2000 | Hilborn et al. ............. 523/219 |
| 6,110,982 A | 8/2000 | Russick et al. ............... 521/54 |
| 6,129,410 A | 10/2000 | Kosaraju et al. ............ 296/188 |
| 6,131,897 A | 10/2000 | Barz et al. .................. 269/207 |
| 6,135,542 A | 10/2000 | Emmelmann et al. ...... 296/205 |
| 6,149,227 A | 11/2000 | Wycech ..................... 296/188 |
| 6,150,428 A | 11/2000 | Hanley, IV et al. ......... 521/135 |
| 6,152,260 A | 11/2000 | Eipper et al. ............... 181/296 |
| 6,153,709 A | 11/2000 | Xiao et al. .................. 525/528 |
| 6,165,588 A | 12/2000 | Wycech ..................... 428/122 |
| 6,168,226 B1 | 1/2001 | Wycech .................. 296/146.6 |

FOREIGN PATENT DOCUMENTS

| | | |
|---|---|---|
| EP | 94101343.5 | 1/1994 |
| EP | 0 891 918 A1 | 1/1999 |
| EP | 0 893 331 A1 | 1/1999 |
| EP | 0 893 332 A1 | 1/1999 |
| FR | 2749263 A1 | 5/1996 |
| GB | 628863 | 3/1947 |
| GB | 8028960 | 9/1980 |
| GB | 8725028 | 10/1987 |
| JP | 61118211 | 6/1986 |
| JP | 64-69308 | 3/1989 |
| JP | 64-69309 | 3/1989 |
| JP | 01164867 | 6/1989 |
| JP | 2-206537 | 8/1990 |
| JP | 5-38992 | 2/1993 |
| WO | PCT/JP88/00029 | 1/1988 |
| WO | PCT/JP88/00029 | 7/1989 |
| WO | PCT/AU92/00468 | 9/1992 |
| WO | PCT/EP95/00896 | 3/1995 |
| WO | PCT/US96/11155 | 7/1996 |
| WO | PCT/US97/10693 | 6/1997 |
| WO | PCT/US97/07644 | * 11/1997 |
| WO | PCT/US97/19981 | 11/1997 |
| WO | PCT/US98/16461 | 8/1998 |
| WO | PCT/US98/17994 | 9/1998 |
| WO | PCT/US98/08980 | 11/1998 |
| WO | PCT/US99/00035 | 1/1999 |
| WO | PCT/US99/00770 | 1/1999 |
| WO | PCT/US98/16461 | 2/1999 |
| WO | PCT/US99/01855 | 2/1999 |
| WO | PCT/US99/01865 | 2/1999 |
| WO | PCT/US99/04263 | 3/1999 |
| WO | PCT/US99/04279 | 3/1999 |
| WO | PCT/CA99/00424 | 5/1999 |
| WO | PCT/US99/10441 | 5/1999 |
| WO | PCT/US99/11109 | 5/1999 |
| WO | PCT/US99/11110 | 5/1999 |
| WO | PCT/US99/11194 | 5/1999 |
| WO | PCT/US99/11195 | 5/1999 |

| | | |
|---|---|---|
| WO | PCT/EP99/03832 | 6/1999 |
| WO | PCT/EP99/06112 | 8/1999 |
| WO | PCT/US99/18820 | 8/1999 |
| WO | PCT/EP99/07143 | 9/1999 |
| WO | PCT/US99/18832 | 9/1999 |
| WO | PCT/US99/24795 | 10/1999 |
| WO | PCT/US97/07644 | 11/1999 |
| WO | PCT/DE99/04103 | 12/1999 |
| WO | PCT/EP99/09541 | 12/1999 |
| WO | PCT/EP99/09732 | 12/1999 |
| WO | PCT/EP99/09909 | 12/1999 |
| WO | PCT/EP99/10151 | 12/1999 |
| WO | PCT/US99/29986 | 12/1999 |
| WO | PCT/US99/29987 | 12/1999 |
| WO | PCT/US99/29990 | 12/1999 |
| WO | PCT/US99/29991 | 12/1999 |
| WO | PCT/US99/29992 | 12/1999 |
| WO | PCT/US00/00010 | 1/2000 |
| WO | PCT/EP00/00021 | 1/2000 |
| WO | PCT/US00/00497 | 1/2000 |
| WO | PCT/US00/01644 | 1/2000 |
| WO | PCT/EP00/01474 | 2/2000 |
| WO | PCT/US00/02631 | 2/2000 |
| WO | PCT/AT00/00123 | 5/2000 |
| WO | WO 00/37302 | 6/2000 |

OTHER PUBLICATIONS

Co-pending Application Serial No. 09/676,443; filed Sep. 29, 2000.

Co-pending Application Serial No. 09/676,335; filed Sep. 29, 2000.

Co-pending Application Serial No. 09/676,725; filed Sep. 29, 2000.

* cited by examiner

TUBE REINFORCEMENT WITH DEFLECTING WINGS AND STRUCTURAL FOAM

TECHNICAL FIELD

The present invention relates to tube reinforcements, and more particularly to a tube reinforcement designed for complex tubular structures and having at least one deflecting wing for holding the reinforcement in place within the tube.

BACKGROUND ART

Tube structures are used in many applications, such as in automobile A-pillars, B-pillars, C-pillars, the hinge pillar area, rocker panels, the wheel hub area, motor rails, and similar structures. In these tube structures, it is often desirable to place reinforcements at selected areas for added strength. In more complex tube structures, however, it can be difficult to place a reinforcement at a desired location because of bends and varying cross-sectional areas in the tube cavity. Any reinforcement inserted into the end such a structure needs to be small enough to fit through the tube cavity along the length of the tube, including the bends and smaller cross-sectional areas, and yet still be able to stay in place at a desired reinforcement location, even if the cross-sectional area at the desired location is larger. Currently known reinforcements cannot be adjusted to accommodate varying tube cross-sectional areas, and as a result the reinforcement will either be too large to pass through smaller areas of the tube to reach a desired location or too small to stay secured at the desired location once it is positioned.

Structural foam can be used to create a reinforcement assembly that conforms to the tube cavity and that provides even dispersement of forces along the foam. Placing and keeping the foam at the desired reinforcement location before the foam has been expanded and cured, however, still can be difficult for the reasons noted above.

There is a need for a reinforcement assembly that is small enough to fit around curves and through smaller tube dimensions in a tube structure, yet will not shift position once it is placed at a desired location within the tube cavity, even if the tube structure is moved before the structural foam on the assembly has been expanded and cured.

SUMMARY OF THE INVENTION

The present invention is directed to a tube reinforcement assembly for reinforcing complex tube structures, particularly tube structures having bends and/or varying cross-sectional areas in the tube cavity. The assembly includes a carrier and one or more deflecting wings arranged around the carrier. The carrier is preferably smaller than the smallest cross-sectional area of the structure to be reinforced to ensure that the assembly can move through the tube structure's cavity to reach a desired reinforcement location. The deflecting wings are moveable between an extended position and a compressed position and are biased in the extended position, ensuring that the spring forces in the deflecting wings will hold the assembly at a given location once it is placed there, regardless of the tube cavity cross-sectional area at that location. An expandable structural foam layer is disposed on one surface of at least one wing, and preferably on both surfaces of the wing. When the inventive reinforcement assembly is inserted into a tube structure, the deflecting wings move toward their compressed position if the tube cavity size decreases, allowing the assembly to pass through tighter areas and around curves in the tube cavity, if needed, without getting trapped.

Once the reinforcement assembly is placed at the desired reinforcement location, the spring-biased wings press against the inner walls of the tube cavity to hold the assembly in place before the foam is expanded. The wings act as retainers so that the assembly will not shift from the desired position if the tube structure is moved before processing has been completed (e.g. before the structural foam has been expanded to fill the tube structure). The tube structure and the reinforcement assembly is then heated so that the structural foam expands to fill at least a portion of the tube cavity so that the assembly is rigidly held in place. If the structural foam is applied to both surfaces of each wing, one foam layer will expand between the wing and the inner wall of the tube and the other foam layer will expand between the wing and the carrier of the reinforcement assembly. In one embodiment, the expanded foam bonds to the inner wall. As a result, the present invention can reinforce complexly-shaped tubes simply and efficiently.

DETAILED DESCRIPTION OF THE PREFERRED EMBODIMENTS

Figure 1:
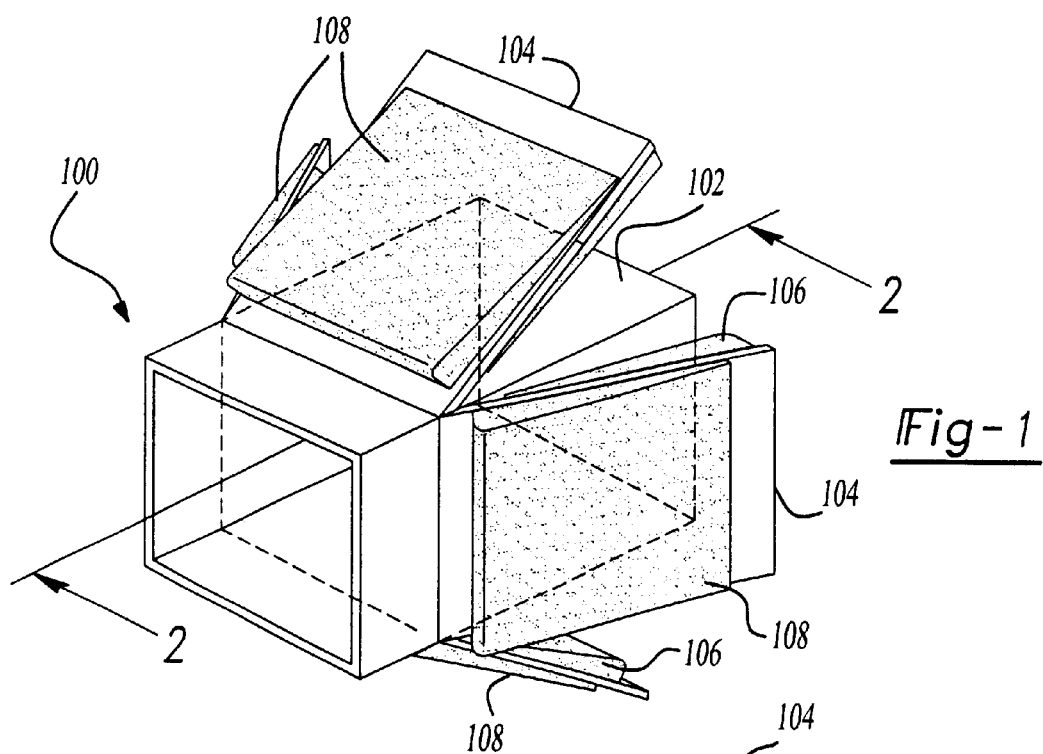
FIG. 1 is a perspective view of one embodiment of a reinforcement assembly according to the present invention.
Figure 2:
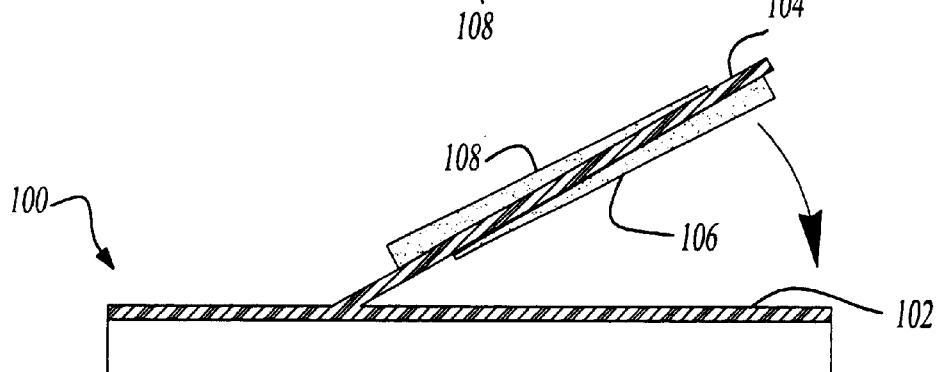
FIG. 2 is a section view of the reinforcement assembly taken along line 2—2 in FIG. 1.
Figure 2:
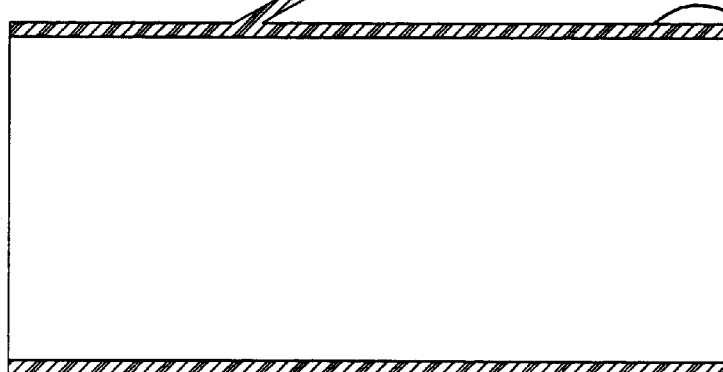
Figure 2:
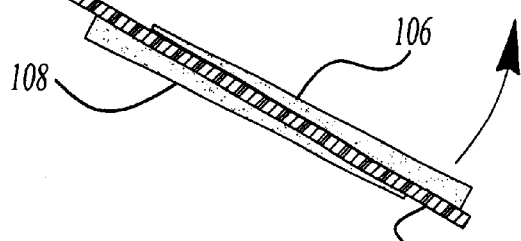

Referring to FIGS. 1 and 2, a reinforcement assembly 100 according to the present invention includes a center carrier 102 and one or more deflecting wings 104. Although FIG. 1 shows an embodiment where the carrier 102 has a square cross-section, the carrier 102 can have any cross-sectional shape and size and therefore can be shaped according to the specific application in which the assembly 100 will be used. The deflecting wings 104 are movable between an extended position, where the wings 104 are farthest away from the carrier 102, and a compressed position, where the wings 104 are pressed inward toward the carrier 102, such as by the inner walls of a tube structure to be reinforced, as indicated by arrows shown in FIG. 2. The wings 104 are preferably spring-biased toward the extended position to ensure secure positioning within the tube structure once the assembly 100 is placed in the cavity. The spring-biasing characteristics are preferably provided by the properties of the material forming the wings 104 themselves, rather than from a separate leaf or coil spring under the wings 104, to minimize the number of components in the assembly 100. For example, as shown in FIG. 2, the wings 104 are bent slightly outward from the carrier 102, biasing the wings 104 in the extended direction. As a result, any inward pressure against the wings 104, such as from a smaller tube cavity, will cause the wings 104 to exert a counteracting force inside the tube cavity, pressing the wing 104 against the inner walls of the tube.

The carrier 102 and the wings 104 can be made of any stiff material that is appropriate for the application in which the assembly 100 will be used, such as nylon, steel polysulfone, polyester, cast iron, titanium, magnesium, or aluminum. The wings 104 can be attached to the carrier 102 by any known means appropriate to the material or materials used to construct the components of the assembly 100. In a preferred embodiment, the carrier 102 and the wings 104 are formed as a one-piece, unitary structure from injection molded polymer, such as nylon. Other possible assemblies include molding the assembly 100 as two separate pieces and snapping the two pieces together in a clamshell fashion, or by attaching the wings 104 to a circumferential ring (not shown) and then attaching the ring, with the wings 104, to the carrier 102.

The geometry of the carrier 102 and the wings 104 is not limited to the configuration shown in FIGS. 1 and 2. The carrier 102 and wings 104 can have any shape and can be customized to fit the tube structure being reinforced. Further, the wings 104 do not have to be symmetrically spaced around the carrier 102 and can even have different curvatures, again depending on the geometry of the tube structure being reinforced. The wings 104 themselves can be planar, curved, or even have multiple curves. Because of the flexibility and adaptability of the inventive assembly 100, a user can select the best configuration, carrier 102 shape, wing 104 shape and curvature, number of wings 104, and wing 104 arrangement to allow the best articulation of the wings 104 within a particular tube cavity configuration.

The carrier 102 preferably is made of a material and/or has a construction that has a high stiffness-to-mass ratio and that is durable enough to withstand hostile environmental conditions, such as those commonly encountered in automotive assembly plants and during the vehicle's service life. The wing 104 material should be selected not only based on its spring characteristics, but also on its moldability, stiffness, and durability. The wings 104 can be made of a polymer, polymer composite, or a metal. If a polymer is used for the wings 104, the material's glass transition temperature should be higher than the highest temperature that the material might encounter during use. This is to ensure that the wings 104 do not plastically deform during installation into a vehicle and thereby fail to function adequately as springs. Note that the material only needs to be stiff enough to allow the spring forces in the wings 104 to maintain the assembly 100 in the tube structure once it is in place.

If a metal is selected for forming the wings 104, the same principles for material selection apply. In addition, if a metal is selected, the material and design choice should be selected so that the carrier 102 and cavity do not form a galvanic cell. As noted above, the wing 104 only needs to be stiff enough and have enough spring force so that the assembly 100 stays in place within the tube cavity once it is positioned. Regardless of the specific material used to form the wings 104, the wing 104 material preferably has a strain to failure of at least 5% to minimize the possibility of fracture when the wing 104 is moved from its extended position to its compressed position. Note that the wings 104 and the carrier 102 do not have to be made of the same material; for example, the carrier 102 can be an aluminum extrusion while the wings 104 are formed from injection molded nylon and attached to the aluminum extrusion via the circumferential ring.

In the preferred embodiment, first and second structural foam layers 106, 108 are applied on either side of each wing 104, as shown in FIG. 2. The structural foam selected to form the layers 106, 108 should have expansion characteristics that allow sufficient electrocoat drainage and even electrocoat deposition in the tube cavity, before the structural foam is expanded, and still expand sufficiently during the curing process to create and maintain secure contact between the expanded structural foam and the tube cavity wall. The bonding characteristics of the foam can be provided either by the foam formulation itself or through a separate adhesive layer disposed between the foam and the tube cavity. Preferred structural foams can expand up to 200% or more of its original volume. Materials having higher expansions can be used with the understanding that higher expansions may result in reduced reinforcement capability. More than one type of structureal foam may be used to create a part. Once the structural foam layers 106, 108 have expanded, the density of the expanded structural foam is preferably less than the density of the carrier 102 and wings 104 to minimize the weight of the assembly 100. Further, the expanded structural foam should not experience large changes in stiffness over the temperature range defining the operating environment of the assembly 100.

More specifically, the preferred structural foam comprises a heat-activated, thermally expandable polymeric formulation. Examples of a base materials that can be used in the formulation of the foam layers 106, 108 include ethylene copolymers or terpolymers, and monomers that may be used to create the polymer, for instance, vinyl acetate, methylacrylate, ethyl acrylate, and alpha-olefins. As a copolymer or terpolymer, the polymer is composed of two or three different monomers, i.e., small molecules with high chemical reactivity that are capable of linking up with similar molecules.

An acceptable foam layer 106, 108 may also be formed from materials that include an epoxy-based structural foam. These structural foams typically include a polymeric base material, such as an epoxy resin with a possible addition of an ethylene-based polymer which, when compounded with appropriate ingredients, expands and cures in a reliable and predictable manner upon the application of heat. From a chemical standpoint, it is noteworthy that prior to curing the foam is usually initially processed as a thermoplastic material. Following curing, the foam typically becomes a thermoset material by way of a cross-linking process. Preferred structural foams include epoxy-based structural foams such as L-5204, L-5205, L-5206, L-5207, L-5208 or L-5209, available from L&L Products.

While preferred materials for forming the foam layers 106, 108 have been disclosed, the foam layers 106, 108 can instead be formed from other materials as well, provided that the material is heat-activated and thermally expands in a similar predictable and reliable manner under appropriate conditions for the application. Some possible materials include, but are not limited to, heat-activated formulations based on polymers such as polyolefin materials, copolymers and terpolymers with at least one monomer type an alpha-olefin, phenol/formaldehyde materials, phenoxy materials, and polyurethane materials with high glass transition (typically greater than 70 degrees Celsius).

An important consideration involved with the selection and formulation of the heat-activated, thermally expanding material used to form the foam layers 106, 108 is the temperature at which a material reaction or expansion, and possibly curing, will take place. For instance, in most applications, it is undesirable for the material to be reactive at room temperature. More typically, the foam layers 106, 108 will instead become reactive at higher processing temperatures, such as those encountered in an automobile assembly plant. While temperatures encountered in an automobile assembly operation may be in the range of 148.89° C. to 204.44° C. (300° F. to 400° F.), body and paint shop applications are commonly about 115° C. (239° F.) or slightly higher. If needed, blowing agent activators can be incorporated into the composition to cause expansion at lower temperatures.

Figure 3:
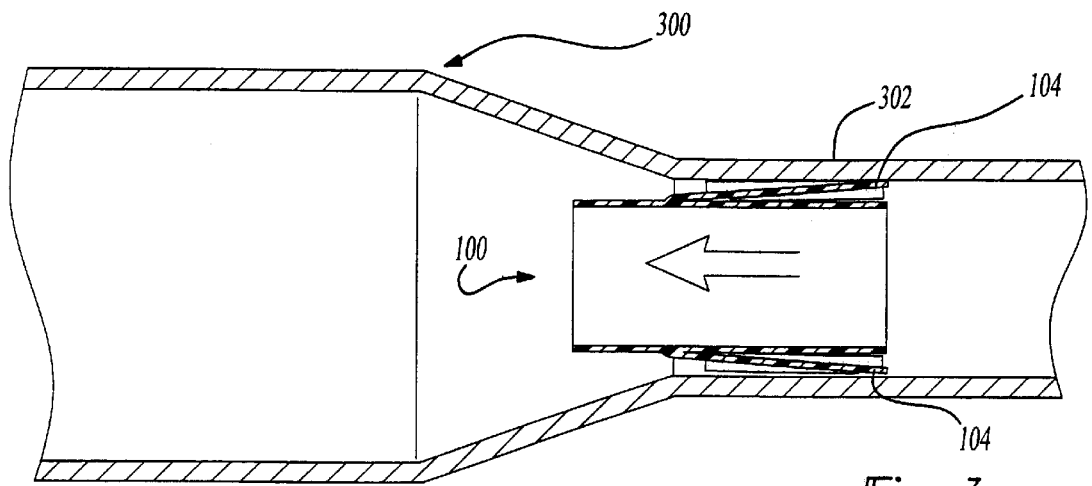
FIGS. 3 through 5 are cutaway views of the reinforcement assembly along line 2—2 in FIG. 2 illustrating how the reinforcement assembly is placed and retained inside a tube cavity.
Figure 4:
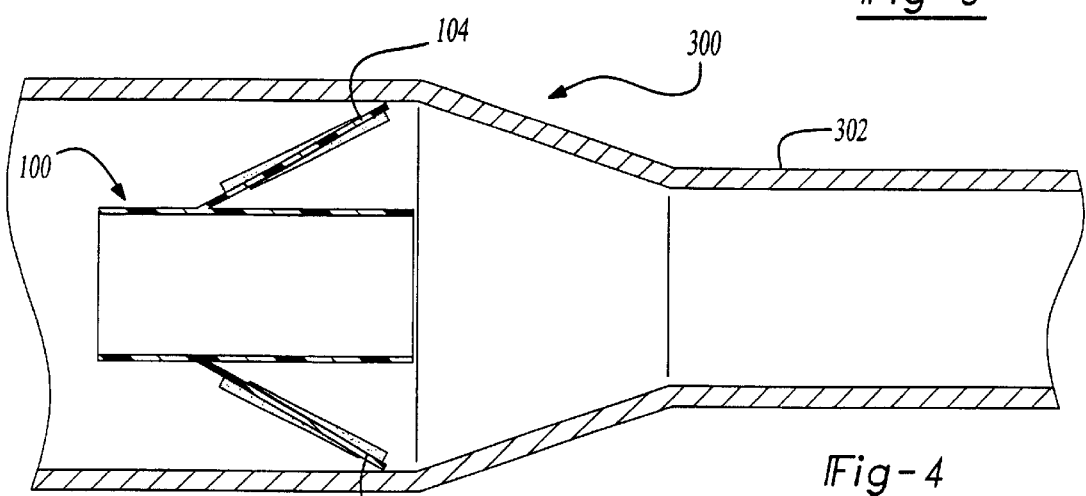
Figure 5:
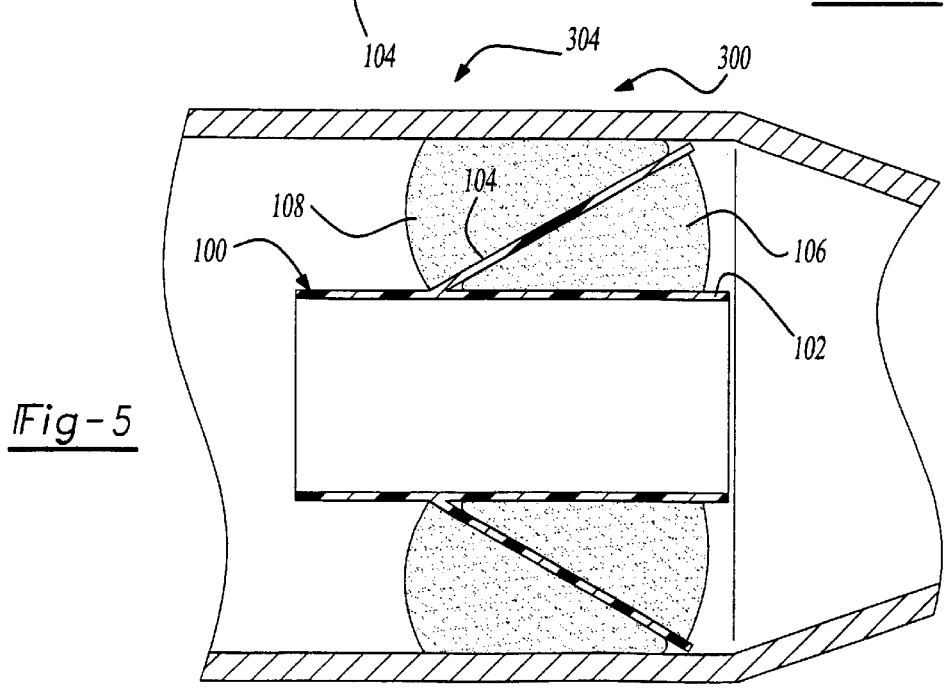

FIGS. 3 through 5 illustrate how the reinforcement assembly 100 is placed and secured inside a tube structure 300. In FIG. 3, the reinforcement assembly 100 is shown being pushed into a narrower cavity section 302 of the tube structure 300, causing the deflecting wings 104 to move toward a compressed position to accommodate the narrower space. FIG. 4 shows the assembly 100 at the desired area to be reinforced 304, which is shown in this example to have a larger cross-sectional area than section 302. As shown in FIG. 4, the spring-biasing force of the wings 104 push the wings 104 outward, toward the extended position. As a result, the assembly 100 is held securely in the desired area by the wings 104. FIG. 5 shows the assembly 100 after the structural foam layers 106, 108 have been expanded. As can be seen in the figure, one foam layer 108 expands to fill the area between the wing 104 and the inner wall of the tube being reinforced, and the other foam layer 106 expands to fill the space between the wing 104 and the carrier 102 of the assembly 100 to form a generally solid structural foam block between the carrier 102 and the inner wall of the cavity. The expanded foam 106, 108 preferably bonds with the tube and the carrier, respectively, either through the foam formulation or through a separate adhesive, as noted above. The structural foam 106, 108 surrounds the assembly 100, holding it in place and providing reinforcement of the tube. As a result, the structural foam 106, 108 dissipates the forces encountered by the tube 300 at the reinforcement point 304 over a larger area.

The inventive device allows precise, easy placement of a reinforcement assembly into a complex tube structure by allowing the total dimensions of the assembly, via deflecting wings 104, to accommodate varying tube structure dimensions and configurations. Further, the relatively hollow cross-section of the assembly 100 and the placement of the structural foam minimizes the amount of material needed to reinforce the tube structure, reducing both the weight and the cost of the reinforcement.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A reinforcement assembly for a tube, comprising:
   a carrier;
   at least one wing attached to the carrier, the wing being deflectable between an extended position and a compressed position to fit within the tube and being biased in the extended position; and
   a structural foam layer disposed on a surface of said at least one wing, wherein the structural foam layer is expandable to hold the reinforcement assembly within the tube and wherein said structural foam layer is disposed on the surface of said at least one wing such that the structural foam expands in between said wing and said carrier of the reinforcement assembly.

2. The reinforcement assembly of claim 1, wherein said structural foam layer is disposed on the surface of said at least one wing such that the structural foam expands in between said wing and an inner wall of the tube.

3. The reinforcement assembly of claim 1, wherein said structural foam layer is a first structural foam layer disposed on a first surface of said at least one wing and wherein the reinforcement assembly further comprises a second structural foam layer disposed on a second surface of said at least one wing, wherein the first structural foam layer is expandable between said at least one wing and an inner wall of the tube and the second structural foam layer is expandable between said at least one wing and said carrier of the reinforcement assembly.

4. The reinforcement assembly of claim 1, wherein at least one of said carrier and said at least one wing are made of polymer.

5. The reinforcement assembly of claim 4, wherein the polymer is selected from the group consisting of nylon, polysulfone, and polyester.

6. The reinforcement assembly of claim 1, wherein at least one of said carrier and said at least one wing are made of metal.

7. The reinforcement assembly of claim 6, wherein the metal is one selected from the group consisting of steel, aluminum, magnesium, cast iron, and titanium.

8. A reinforcement assembly for a tube, comprising;
   a carrier;
   a plurality of wings attached to the carrier, each wing being deflectable between an extended position and a compressed position to fit within the tube and being biased in the extended position wherein said plurality of wings is attached to said carrier by attaching said plurality of wings to a circumferential ring and attaching said circumferential ring to said carrier; and
   a structural foam layer disposed on a surface of each wing, wherein the structural foam layer is expandable to hold the reinforcement assembly within the tube.

9. The reinforcement assembly of claim 8, wherein said structural foam layer is disposed on the surface of each wing such that the structural foam expands in between the wing and an inner wall of the tube.

10. The reinforcement assembly of claim 8, wherein said structural foam layer is disposed on the surface of each wing such that the structural foam expands in between said wing and said carrier of the tube reinforcement assembly.

11. The reinforcement assembly of claim 8, wherein said structural foam layer is a first structural foam layer disposed on a first surface of each wing and further comprising a second structural foam layer disposed on a second surface of each wing, wherein the first structural foam layer is expandable between each wing and an inner wall of the tube and the second structural foam layer is expandable between each wing and said carrier of the tube reinforcement assembly.

12. The reinforcement assembly of claim 8, wherein at least one of said carrier and at least one of said plurality of wings are made of polymer.

13. The reinforcement assembly of claim 12, wherein the polymer is selected from the group consisting of nylon, polysulfone, and polyester.

14. The reinforcement assembly of claim 8, wherein at least one of said carrier and at least one of said plurality of wings are made of metal.

15. The reinforcement assembly of claim 14, wherein the metal is one selected from the group consisting of steel, aluminum, cast iron, titanium and magnesium.

16. The reinforcement assembly of claim 8, wherein said plurality of wings are disposed in a symmetrical fashion around said carrier.

17. The assembly of claim 8, wherein said carrier and said wings are formed as a unitary assembly.

18. A reinforcement assembly for a tube, comprising:
   a carrier;
   a plurality of wings attached to the carrier, each wing being deflectable between an extended position and a compressed position to fit within the tube and being biased in the extended position; and
   a structural foam layer disposed on a surface of each wing, wherein the structural foam layer is expandable to hold the reinforcement assembly within the tube and wherein at least one of said plurality of wings has at least one curved portion.

19. The reinforcement of claim 18, wherein said plurality of wings are attached to said carrier by attaching said plurality of wings to a circumferential ring and attaching said circumferential ring to said carrier.

20. The reinforcement assembly of claim 18, wherein said plurality of wings are disposed in a symmetrical fashion around said carrier.

* * * * *